(12) United States Patent
Karabinis

(10) Patent No.: US 7,454,175 B2
(45) Date of Patent: Nov. 18, 2008

(54) BROADBAND WIRELESS COMMUNICATIONS SYSTEMS AND METHODS USING MULTIPLE NON-CONTIGUOUS FREQUENCY BANDS/SEGMENTS

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 721 days.

(21) Appl. No.: 11/006,318

(22) Filed: Dec. 7, 2004

(65) Prior Publication Data

US 2006/0233147 A1 Oct. 19, 2006

(51) Int. Cl.
H04B 1/38 (2006.01)
(52) U.S. Cl. .................. 455/73; 370/320; 370/335; 370/342
(58) Field of Classification Search ............... 455/73; 370/342, 335, 320
See application file for complete search history.

(56) References Cited

U.S. PATENT DOCUMENTS

| | | | |
|---|---|---|---|
| 4,901,307 A | 2/1990 | Gilhousen et al. | |
| 5,073,900 A | 12/1991 | Mallinckrodt | |
| 5,303,286 A | 4/1994 | Wiedeman | |
| 5,339,330 A | 8/1994 | Mallinckrodt | |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A | 9/1996 | Dent | |
| 5,584,046 A | 12/1996 | Martinez et al. | |
| 5,612,703 A | 3/1997 | Mallinckrodt | |
| 5,619,525 A | 4/1997 | Wiedeman et al. | |
| 5,631,898 A | 5/1997 | Dent | |
| 5,761,605 A | 6/1998 | Tawil et al. | |
| 5,765,098 A | 6/1998 | Bella | |
| 5,812,947 A | 9/1998 | Dent | |

(Continued)

FOREIGN PATENT DOCUMENTS

EP 0 506 255 A2 9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

Alasti et al, "A Discrete Multi Carrier Multiple Access Technique for Wireless Communications" *Vehicular Technology Conference, 1998, VTC 98, 48th* IEEE, 2(18):1533-1537 (1998).

(Continued)

*Primary Examiner*—Matthew Anderson
*Assistant Examiner*—April S Guzman
(74) *Attorney, Agent, or Firm*—Myers Bigel Sibley & Sajovec, P.A.

(57) ABSTRACT

Wireless communications transceivers include a transmitter that is configured to selectively frequency shift and transmit portions of broadband information over multiple non-contiguous narrowband frequency bands/segments, each of which is too narrow to carry the broadband information. A receiver also is configured to receive and selectively frequency shift portions of broadband information from multiple non-contiguous narrowband frequency bands/segments, each of which is too narrow to carry the second broadband information. Broadband information thereby may be transmitted and received in a regulated communications environment, even though a given provider may only be assigned discontinuous frequency bands/segments, none of which is wide enough to carry the entire broadband information.

36 Claims, 4 Drawing Sheets

U.S. PATENT DOCUMENTS

| | | |
|---|---|---|
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 * | 3/2001 | Hogberg et al. ............. 370/320 |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,243,370 B1 * | 6/2001 | Schilling ..................... 370/335 |
| 6,253,080 B1 | 6/2001 | Wiedeman et al. |
| 6,256,497 B1 | 7/2001 | Chambers |
| 6,295,461 B1 * | 9/2001 | Palmer et al. ................ 455/557 |
| 6,324,405 B1 | 11/2001 | Young et al. |
| 6,339,707 B1 | 1/2002 | Wainfan et al. |
| 6,389,002 B1 * | 5/2002 | Schilling ..................... 370/342 |
| 6,407,989 B2 * | 6/2002 | Schilling ..................... 370/335 |
| 6,418,147 B1 | 7/2002 | Wiedeman |
| 6,449,461 B1 | 9/2002 | Otten |
| 6,522,865 B1 | 2/2003 | Otten |
| 6,628,919 B1 | 9/2003 | Curello et al. |
| 6,684,057 B2 | 1/2004 | Karabinis |
| 6,711,145 B2 * | 3/2004 | Schilling ..................... 370/335 |
| 6,735,437 B2 | 5/2004 | Mayfield et al. |
| 6,775,251 B1 | 8/2004 | Wiedeman et al. |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,020,125 B2 * | 3/2006 | Schilling ..................... 370/342 |
| 7,155,340 B2 * | 12/2006 | Churan ........................ 701/213 |
| 2002/0041575 A1 | 4/2002 | Karabinis et al. |
| 2002/0090942 A1 | 7/2002 | Karabinis et al. |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0054761 A1 | 3/2003 | Karabinis |
| 2003/0054762 A1 | 3/2003 | Karabinis |
| 2003/0054814 A1 | 3/2003 | Karabinis et al. |
| 2003/0054815 A1 | 3/2003 | Karabinis |
| 2003/0068978 A1 | 4/2003 | Karabinis et al. |
| 2003/0073436 A1 | 4/2003 | Karabinis et al. |
| 2003/0149986 A1 | 8/2003 | Mayfield et al. |
| 2003/0153267 A1 | 8/2003 | Karabinis |
| 2003/0153308 A1 | 8/2003 | Karabinis |
| 2003/0224785 A1 | 12/2003 | Karabinis |
| 2004/0072539 A1 | 4/2004 | Monte et al. |
| 2004/0102156 A1 | 5/2004 | Loner |
| 2004/0121727 A1 | 6/2004 | Karabinis |
| 2004/0142660 A1 | 7/2004 | Churan |
| 2004/0192200 A1 | 9/2004 | Karabinis |
| 2004/0192293 A1 | 9/2004 | Karabinis |
| 2004/0192395 A1 | 9/2004 | Karabinis |
| 2004/0203393 A1 | 10/2004 | Chen |
| 2004/0203742 A1 | 10/2004 | Karabinis |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Singh et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040659 A1 | 2/2006 | Karabinis |
| 2006/0233147 A1 * | 10/2006 | Karabinis ................... 370/342 |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| WO | WO 01/54314 A1 | 7/2001 |

OTHER PUBLICATIONS

Mestdagh et al. "Zipper VDSL: A Solution for Robust Duplex Communication over Telephone Lines" *IEEE Communications Magazine* 38(5):90-96 (2000).

Notification of Transmittal of the International Search Report and the Written Opinion of the International Searching Authority, or the Declaration, International Search Report, and Written Opinion of the International Searching Authority, PCT International Application No. PCT/US2005/040400, Jul. 25, 2006.

*ADSL Tutorial*, DSL Forum, 3 pp., 2001.

* cited by examiner

BROADBAND WIRELESS COMMUNICATIONS SYSTEMS AND METHODS USING MULTIPLE NON-CONTIGUOUS FREQUENCY BANDS/SEGMENTS

FIELD OF THE INVENTION

This invention relates to wireless communications systems and methods, and more particularly to terrestrial and satellite wireless communications systems and methods.

BACKGROUND OF THE INVENTION

Wireless communications systems and methods are widely used for transmitting and/or receiving information between at least two entities using a modulated carrier frequency that occupies a substantially contiguous band of frequencies over a predetermined bandwidth. For example, an Orthogonal Frequency Division Multiplexed/Multiple Access (OFDM/OFDMA) communications system and method may use a number of modulated sub-carriers which are contiguously configured in frequency so as to occupy a maximum predetermined aggregate (overall) carrier bandwidth of, for example, 1.25 MHz. Terrestrial wireless communications systems and methods may be based on cellular/PCS and/or other techniques. The overall design and operation of terrestrial wireless communications systems and methods is well known to those having skill in the art, and need not be described further herein Satellite communications systems and methods are based on wireless communications technologies and employ at least one space-based component, such as one or more satellites, that is/are configured to communicate with a plurality of satellite radioterminals. A satellite radioterminal communications system or method may utilize a single antenna beam covering an entire area served by the system. Alternatively, in cellular satellite radioterminal communications systems and methods, multiple beams are provided, each of which can serve distinct geographical areas in the overall service region, to collectively serve an overall satellite footprint. Thus, a cellular architecture similar to that used in conventional terrestrial cellular/PCS radioterminal systems and methods can be implemented in cellular satellite-based systems and methods. The satellite typically communicates with radioterminals over a bidirectional communications pathway, with radioterminal communication signals being communicated from the satellite to the radioterminal over a downlink or forward link, and from the radioterminal to the satellite over an uplink or return link.

The overall design and operation of cellular satellite radioterminal systems and methods are well known to those having skill in the art, and need not be described further herein. Moreover, as used herein, the term "radioterminal" includes cellular and/or satellite radioterminals with or without a multi-line display; Personal Communications System (PCS) terminals that may combine a radioterminal with data processing, facsimile and/or data communications capabilities; Personal Digital Assistants (PDA) that can include a radio frequency transceiver and a pager, Internet/Intranet access, Web browser, organizer, calendar and/or a global positioning system (GPS) receiver; and/or conventional laptop and/or palmtop computers or other appliances, which include a radio frequency transceiver. As used herein, the term "radioterminal" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space. A "radioterminal" also may be referred to herein as a "radiotelephone," "terminal", "wireless terminal" or "wireless user device".

Terrestrial networks can enhance cellular satellite radioterminal system availability, efficiency and/or economic viability by terrestrially reusing at least some of the frequency bands that are allocated to cellular satellite radioterminal systems. In particular, it is known that it may be difficult for cellular satellite radioterminal systems to reliably serve densely populated areas, because the satellite signal may be blocked by high-rise structures and/or may not penetrate into buildings. As a result, the satellite spectrum may be underutilized or unutilized in such areas. The terrestrial reuse of at least some of the satellite system frequencies can reduce or eliminate this potential problem.

Moreover, the capacity of a hybrid system, comprising terrestrial and satellite-based connectivity and configured to terrestrially reuse at least some of the satellite-band frequencies, may be higher than a corresponding satellite-only system since terrestrial frequency reuse may be much denser than that of the satellite-only system. In fact, capacity may be enhanced where it may be mostly needed, i.e., in densely populated urban/industrial/commercial areas where the connectivity/signal(s) of a satellite-only system may be unreliable. As a result, a hybrid (satellite/terrestrial cellular) system that is configured to reuse terrestrially at least some of the frequencies of the satellite band may become more economically viable, as it may be able to serve more effectively and reliably a larger subscriber base.

U.S. Pat. No. 6,684,057, to inventor Karabinis, and entitled Systems and Methods for Terrestrial Reuse of Cellular Satellite Frequency Spectrum, the disclosure of which is hereby incorporated herein by reference in its entirety as if set forth fully herein, describes that a satellite frequency can be reused terrestrially by an ancillary terrestrial network even within the same satellite cell, using interference cancellation techniques. In particular, a system according to some embodiments of U.S. Pat. No. 6,684,057 includes a space-based component that is configured to receive wireless communications from a first radiotelephone in a satellite footprint over a satellite radiotelephone frequency band, and an ancillary terrestrial network that is configured to receive wireless communications from a second radiotelephone in the satellite footprint over the satellite radiotelephone frequency band. The space-based component also receives the wireless communications from the second radiotelephone in the satellite footprint over the satellite radiotelephone frequency band as interference, along with the wireless communications that are received from the first radiotelephone in the satellite footprint over the satellite radiotelephone frequency band. An interference reducer is responsive to the space-based component and to the ancillary terrestrial network that is configured to reduce the interference from the wireless communications that are received by the space-based component from the first radiotelephone in the satellite footprint over the satellite radiotelephone frequency band, using the wireless communications that are received by the ancillary terrestrial network from the second radiotelephone in the satellite footprint over the satellite radiotelephone frequency band.

Satellite radioterminal communications systems and methods that may employ terrestrial reuse of satellite frequencies are also described in U.S. Pat. No. 6,785,543 to Karabinis, entitled Filters For Combined Radiotelephone/GPS Terminals, and Published U.S. Patent Application Nos. US 2003/

0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0153267 to Karabinis, entitled Wireless Communications Systems and Methods Using Satellite-Linked Remote Terminal Interface Subsystems; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; US 2003/0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, US 2004/0121727 to Karabinis, entitled Systems and Methods For Terrestrial Reuse of Cellular Satellite Frequency Spectrum In A Time-Division Duplex Mode, US 2004/0192293 to Karabinis, entitled Aggregate Radiated Power Control For Multi-Band/Multi-Mode Satellite Radiotelephone Communications Systems And Methods, US 2004/0142660 to Churan, entitled Network-Assisted Global Positioning Systems, Methods And Terminals Including Doppler Shift And Code Phase Estimates, and US 2004/0192395 to Karabinis, entitled Co-Channel Wireless Communication Methods and Systems Using Nonsymmetrical Alphabets, all of which are assigned to the assignee of the present invention, the disclosures of all of which are hereby incorporated herein by reference in their entirety as if set forth fully herein.

Satellite communications systems and methods may be used for voice and/or data. Moreover, satellite communications systems and methods are increasingly being used with broadband information, such as multimedia information. Unfortunately, it may be difficult to send and receive broadband information over conventional satellite communications systems and methods.

SUMMARY OF THE INVENTION

Wireless communications transceivers according to exemplary embodiments of the present invention include a transmitter and a receiver that may be included in a radioterminal, a space-based component, a gateway, a terrestrial base station and/or an ancillary terrestrial component. The transmitter and receiver are configured to transmit and receive, respectively, broadband information over a plurality of non-contiguous (i.e., spaced apart) narrowband frequency bands/segments, each of which is too narrow to carry the broadband information. Accordingly, broadband information may be transmitted and received, even though a given provider may only be assigned non-contiguous frequency bands/segments, such as, for example, non-contiguous frequency bands/segments of a satellite L-band, that are interleaved with frequency bands/segments of other providers, wherein none of the given provider's non-contiguous satellite frequency bands/segments is wide enough to carry the entire broadband information.

In other embodiments of the present invention, the transceiver includes a transmitter that is configured to selectively transmit a first waveform over a plurality of first frequency bands/segments that are interleaved with second frequency bands/segments, and to selectively bypass the second frequency bands/segments. A receiver also is configured to receive a second waveform from a plurality of third frequency bands/segments that are interleaved with fourth frequency bands/segments, and to selectively bypass the fourth frequency bands/segments.

In particular, in some embodiments of the invention, the transmitter is configured to selectively frequency shift and transmit portions of first broadband information over a plurality of first non-contiguous narrowband frequency bands/segments, each of which is too narrow to carry the first broadband information, so as to transmit the first broadband information over the plurality of first non-contiguous narrowband frequency bands/segments. The receiver is configured to receive and selectively frequency shift portions of second broadband information from a plurality of second non-contiguous narrowband frequency bands/segments, each of which is too narrow to carry the second broadband information, so as to receive the second broadband information over the plurality of second non-contiguous narrowband frequency bands/segments. In some embodiments, the first and second non-contiguous narrowband frequency bands/segments may be distinct or may at least partially overlap.

In further embodiments of the invention, the transmitter includes a modulator that is configured to modulate a first carrier frequency with the first broadband information. A frequency translator is configured to translate portions of the first carrier frequency that is modulated with the first broadband information into a plurality of carrier frequencies in the plurality of first non-contiguous frequency bands/segments, each of which is modulated with a portion of the first broadband information. A power amplifier is configured to amplify the plurality of carrier frequencies in the plurality of first non-contiguous frequency bands/segments, each of which is modulated with a portion of the first broadband information.

In other embodiments, the transmitter may also include a time-domain to frequency-domain converter that is configured to convert the first carrier frequency that is modulated with the first broadband information from a time domain into a frequency domain representation, wherein the frequency translator is responsive to the time-domain to frequency-domain converter. A frequency-domain to time-domain converter is configured to convert the plurality of carrier frequencies in the plurality of first non-contiguous frequency bands/segments, each of which is modulated with a portion of the first broadband information, back into the time domain, wherein the power amplifier is responsive to the frequency-domain to time domain-converter.

In some embodiments, the time-domain to frequency-domain converter includes an analog-to-digital converter that is responsive to the modulator and a Fourier transformer such as a Fast Fourier Transformer (FFT) that is responsive to the analog-to-digital converter. Moreover, the frequency-domain to time-domain converter includes an inverse Fourier transformer such as an Inverse Fast Fourier Transformer (IFFT) that is responsive to the frequency translator and a digital-to-analog converter that is responsive to the Inverse Fast Fourier Transformer. In these embodiments, the frequency translator may be a digital frequency translator.

In still other embodiments, the time-domain to frequency-domain converter includes a plurality of bandpass filters, and the frequency-domain to time-domain converter includes a summer. In these embodiments, the frequency translator includes a plurality of analog mixers.

Receivers according to various embodiments of the present invention include a sub-band channelizer that is configured to isolate the plurality of second non-contiguous narrowband frequency bands/segments. A frequency translator is configured to translate the plurality of second non-contiguous narrowband frequency bands/segments that are isolated, into a contiguous frequency band/segment. A demodulator is configured to demodulate the contiguous frequency band/segment, to extract a measure of the second broadband information.

In some embodiments, the receiver also includes a time-domain to frequency-domain converter that is configured to convert the plurality of second non-contiguous narrowband frequency bands/segments into a frequency domain representation, wherein the sub-band channelizer is responsive to the time-domain to frequency-domain converter. Moreover, a frequency-domain to time-domain converter is configured to convert the contiguous frequency band/segment back into the time domain, wherein the demodulator is responsive to the frequency-domain to time-domain converter.

In some embodiments, the time-domain to frequency-domain converter includes an analog-to-digital converter that is responsive to the plurality of second non-contiguous narrowband frequency bands/segments, and a Fourier transformer such as a Fast Fourier Transformer that is responsive to the analog-to-digital converter. In these embodiments, the frequency-domain to time-domain converter includes an inverse Fourier transformer such as an Inverse Fast Fourier Transformer that is responsive to the frequency translator and a digital-to-analog converter that is responsive to the Inverse Fast Fourier Transformer. In these embodiments, the frequency translator may be a digital frequency translator. In other embodiments, the time-domain to frequency-domain converter includes a plurality of bandpass filters and the frequency-domain to time-domain converter includes a summer. In these embodiments, the frequency translator may include a plurality of modulators.

In some embodiments of the present invention, the plurality of first and second non-contiguous narrowband frequency bands/segments are controlled by a single wireless communications provider. In some embodiments, the transmitter is configured to preferentially transmit first broadband information over a plurality of first non-contiguous narrowband frequency bands/segments, each of which is too narrow to carry the first broadband information so as to transmit the first broadband information over the plurality of first non-contiguous narrowband frequency bands/segments, while suppressing the first broadband information outside the plurality of first non-contiguous narrowband frequency bands/segments. In other embodiments, the transmitter is configured to preferentially assign subportions of the first broadband information to the plurality of first non-contiguous narrowband frequency bands/segments, each of which is too narrow to carry the first broadband information, and to transmit the preferentially assigned subportions of the first broadband information over the plurality of first non-contiguous narrowband frequency bands/segments, so as to receive the second broadband information over the plurality of second non-contiguous narrowband frequency bands/segments.

It will be understood that embodiments of the present invention have been described above primarily with respect to wireless communications transmitters and receivers. However, analogous wireless communications transmitting and receiving methods also may be provided.

DETAILED DESCRIPTION

Figure 1:
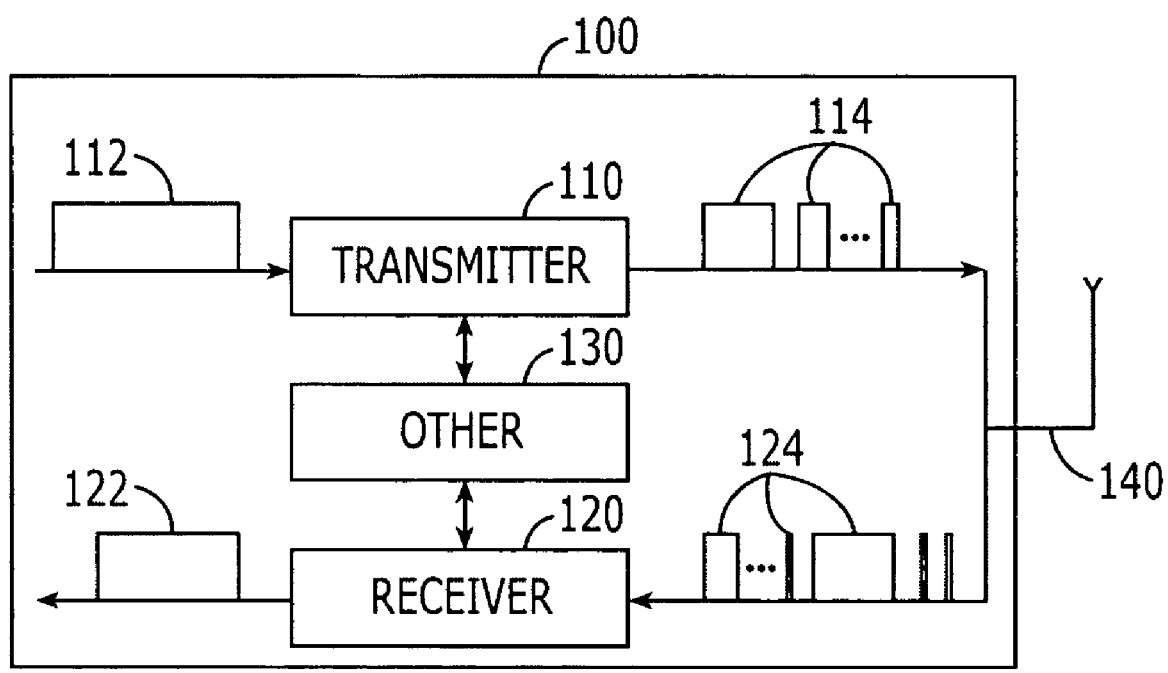
FIG. 1 is a block diagram of communications components and methods, including transceivers and transceiving methods according to various embodiments of the present invention.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first frequency band below could be termed a second frequency band, and similarly, a second frequency band may be termed a first frequency band without departing from the teachings of the present invention. As used herein, the term "and/or" includes any and all combinations of one or more of the associated listed items. The symbol "/" is also used as a shorthand notation for "and/or".

Moreover, as used herein, the terms "broadband" and "narrowband" are used relative to one another, such that a narrowband frequency band is not wide enough (i.e., is too narrow) to carry the entire broadband information. Moreover, the term "band/segment" includes a frequency band, such as L-band or S-band, and a sub-band of a frequency band, such as a sub-band of L-band or S-band.

Embodiments of the present invention provide broadband communications systems and methods that use multiple non-contiguous (i.e., spaced apart) narrowband frequency bands to transmit broadband information. Some embodiments of the present invention may arise from a recognition that a single communications provider may only be allocated a plurality of non-contiguous frequency bands/segments, for example in L-band, any given bandwidth of which may be insufficient to transmit or receive desired broadband information. For example, multimedia information may have a bandwidth of about 5 MHz, yet a given provider may control a plurality of narrowband frequency bands, none of which is wider than, for example, 3 MHz. Notwithstanding these constraints, embodiments of the invention allow a communications transceiver to preferentially assign subportions of broadband information to a plurality of non-contiguous narrowband frequency bands, each of which is too narrow to carry the broadband information, and to transmit the preferentially assigned subportions of the broadband information over the plurality of non-contiguous narrowband frequency bands.

Embodiments of the present invention may be contrasted with Frequency Division Multiplexing (FDM) and/or Frequency Division Multiple Access (FDMA) systems and methods, including Orthogonal FDM (OFDM)/Orthogonal FDMA (OFDMA) and/or Time-Frequency Division Multiplexing (T-FDM)/Time-Frequency Division Multiple Access (T-FDMA) systems and methods, wherein a carrier may be defined to comprise more than one sub-band carrier, and the information associated with a user may be associated with (transported/carried by) more than one sub-band carrier. FDM/FDMA communications systems and methods may be used to transmit and receive information over contiguous groups of wireless sub-band carriers. OFDM is also used for wired communications, for example in Digital Subscriber Line (DSL) technology. See, for example, the ADSL Tutorial, published by the DSL Forum, 2001.

Embodiments of the present invention may also be contrasted with U.S. Pat. Nos. 6,243,370; 6,389,002; and 6,407,989 to Schilling, wherein notch filters are used to delete elements of broadband information that would otherwise have occupied frequency bands/segments used by other systems, before transmitting the broadband information. In contrast, some embodiments of the present invention do not delete elements of a broadband waveform, prior to transmitting the broadband waveform, but instead, re-position elements of the broadband waveform (frequency-domain components or spectral components of the broadband waveform) over narrowband frequency bands/segments that are available to the system. As such, whereas the technique(s) described in U.S. Pat. Nos. 6,243,370; 6,389,002; and 6,407,989 to Schilling may be used to transmit/receive a broadband waveform over narrowband frequency bands/segments absent of some of the content of the broadband waveform, the present invention may be used to transmit/receive a broadband waveform over narrowband frequency bands/segments substantially in full content.

Embodiments of the present invention can allow broadband FDM/FDMA, TDM/TDMA, CDM/CDMA, OFDM/OFDMA, and/or other multiplexing/multiple-access techniques, to be used in some domains wherein only non-contiguous narrowband frequency bands/segments may be controlled by a communications provider/operator. High speed broadband information may thereby be transported in communications systems and methods, notwithstanding the existing non-contiguous band segmentation of a frequency band, such as L-band.

FIG. 1 is a block diagram of communications components that include communications transceivers according to various embodiments of the present invention. As shown in FIG. 1, a communications component 100 can include a radioterminal, a space-based component, a gateway, a terrestrial base station and/or an ancillary terrestrial component. The communications component 100 includes a transmitter 110 and a receiver 120, which together form a transceiver. Other subsystems 130 also may be provided, depending upon the functionality of the communications component 100, as is well known to those having skill in the art.

Continuing with the description of FIG. 1, the transmitter 110 is configured to selectively frequency shift and transmit portions of first broadband information 112 over a plurality of first non-contiguous narrowband frequency bands/segments 114, each of which is too narrow to carry the first broadband information, so as to transmit the first broadband information over the plurality of first non-contiguous narrowband frequency bands/segments. Moreover, the receiver 120 is configured to receive and selectively frequency shift portions of second broadband information 122 from a plurality of second non-contiguous narrowband frequency bands/segments 124, each of which is too narrow to carry the second broadband information, so as to receive the second broadband information over the plurality of second non-contiguous narrowband frequency bands/segments. One or more common and/or different antennas 140 may be used for transmitting and receiving. As shown in FIG. 1, the first and second broadband information 112 and 122, respectively, may have the same or different bandwidths, and the first and second non-contiguous narrowband frequency bands/segments 114 and 124 may overlap, at least in part, or may be disjoint. The number and bandwidths of the first and second non-contiguous narrowband frequency bands/segments also may be identical or different.

Stated differently, FIG. 1 illustrates a communications transceiver according to embodiments of the present invention that include a transmitter 110 that is configured to selectively transmit a first broadband waveform 112 over a plurality of first frequency bands/segments 114 that are interleaved with second frequency bands/segments (shown as the gaps among the first frequency bands 114 in FIG. 1), and to selectively bypass the second frequency bands/segments. Moreover, FIG. 1 also illustrates a receiver 120 according to embodiments of the present invention, that is configured to receive a second broadband waveform 122 from a plurality of third frequency bands/segments 124 that are interleaved with fourth frequency bands/segments (shown as the gaps among the third frequency bands/segments 124), and to selectively bypass the fourth frequency bands/segments.

Figure 2:
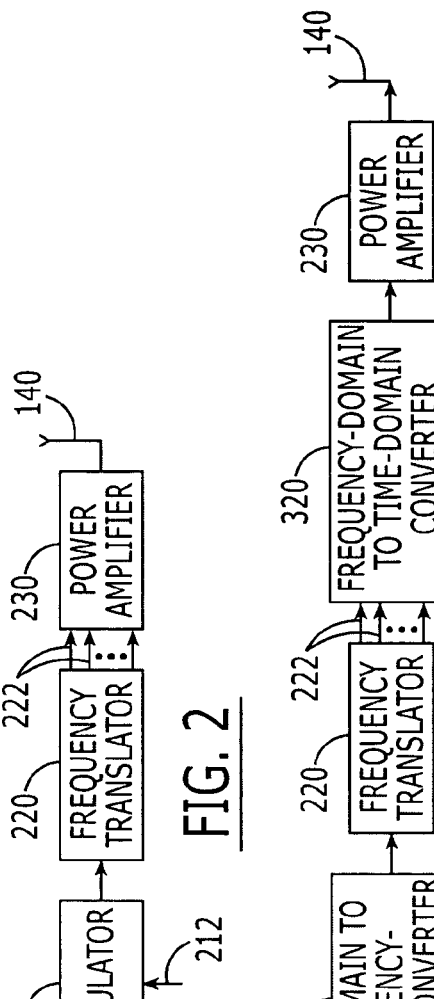
FIGS. 2 and 3 are block diagrams of transmitters and transmitting methods according to various embodiments of the present invention.

FIG. 2 is a block diagram of transmitters according to various embodiments of the present invention, which may correspond to the transmitter 110 of FIG. 1. As shown in FIG. 2, these transmitters include a modulator 210 that is configured to modulate a first carrier frequency 212 with the first broadband information 112. The first carrier frequency 212 may be selected to be any carrier frequency, and need not be, but may be, in the cellular, PCS or satellite frequency bands. A frequency translator 220 is configured to translate portions of the first carrier frequency 212 that is modulated with the first broadband information 112 into a plurality of carrier frequencies 222 in the plurality of first non-contiguous frequency bands/segments 114, each of which is modulated with a portion of the first broadband information 112. A power amplifier 230 is configured to amplify the plurality of carrier frequencies 222 in the plurality of first non-contiguous frequency bands/segments 114, each of which is modulated with a portion of the first broadband information 112.

Figure 3:
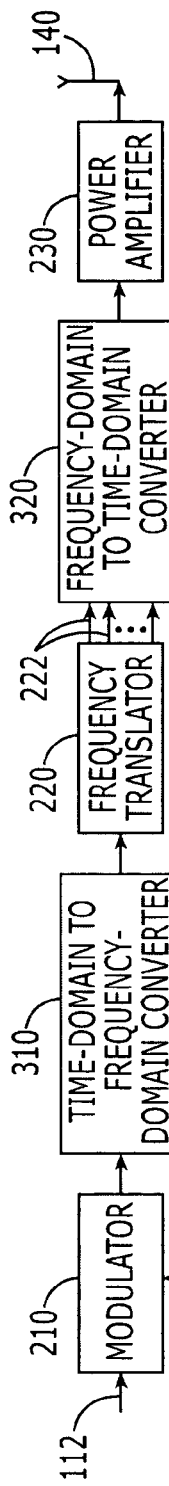

FIG. 3 is a block diagram of transmitters according to still other embodiments of the present invention, which may correspond to transmitters 110 of FIG. 1. In these embodiments, time-domain to frequency-domain conversion takes place prior to frequency translation, and frequency-domain to time-domain conversion takes place after frequency translation. In particular, in FIG. 3, a time-domain to frequency-domain converter 310 is configured to convert the first carrier frequency 212 that is modulated with the first broadband information 112 from a time domain into a frequency domain, and the frequency translator 220 is responsive to the time-domain to frequency-domain converter 310. Moreover, a frequency-domain to time-domain converter 320 is configured to convert the plurality of carrier frequencies 222 in the plurality of first non-contiguous frequency bands/segments 114, each of which is modulated with a portion of the first broadband information 112, back into the time domain. The power amplifier 230 is responsive to the frequency-domain to time-domain converter.

In some embodiments of FIG. 3, the time-domain to frequency-domain converter 310 and/or the frequency-domain to time-domain converter 320 comprise digital components/circuits and/or discrete-time (digital) signal processing, whereas, in other embodiments, the time-domain to frequency-domain converter 310 and/or the frequency-domain to time-domain converter 320 comprise analog components/circuits and/or analog (continuous-time) signal processing. In other embodiments, the time-domain to frequency-domain converter 310 and/or the frequency-domain to time-domain converter 320 comprise digital components/circuits and/or discrete-time (digital) signal processing and analog components/circuits and/or analog (continuous-time) signal processing. More specifically, in digital (discrete-time) embodiments, the time-domain to frequency-domain converter 310 includes an analog-to-digital converter that is responsive to the modulator 210 and a Fourier transformer such as a Fast Fourier Transformer (FFT), or a functional equivalent thereof, that is responsive to the analog-to-digital converter. The frequency-domain to time-domain converter 320 includes an inverse Fourier transformer such as an Inverse Fast Fourier Transformer (IFFT), or a functional equivalent thereof, that is responsive to the frequency translator 220, and a digital-to-analog converter that is responsive to the Inverse Fast Fourier Transformer or functional equivalent thereof. In these embodiments, the frequency translator is a digital (discrete-time) frequency translator. In analog (continuous-time) embodiments, the time-domain to frequency-domain converter 310 can include a plurality of bandpass filters, and the frequency-domain to time-domain converter 320 can include a summer. The frequency translator can include a plurality of analog mixers or modulators.

Figure 4:
FIGS. 4 and 5 are block diagrams of receivers and receiving methods according to various embodiments of the present invention.

FIG. 4 is a block diagram of receivers according to various embodiments of the present invention, which may correspond to receivers 120 of FIG. 1. As shown in FIG. 4, these embodiments of receivers include a sub-band channelizer 410 that is configured to isolate the plurality of second non-contiguous frequency bands/segments 124. A frequency translator 420 is configured to translate the plurality of second non-contiguous narrowband frequency bands/segments 124 that are isolated by the sub-band channelizer 410 into a contiguous frequency band 422. The contiguous frequency band may reside within and/or outside of the cellular, PCS and/or satellite frequency bands. A demodulator 430 is configured to demodulate the contiguous frequency band/segment 422 to extract a measure of the second broadband information 122.

Figure 5:
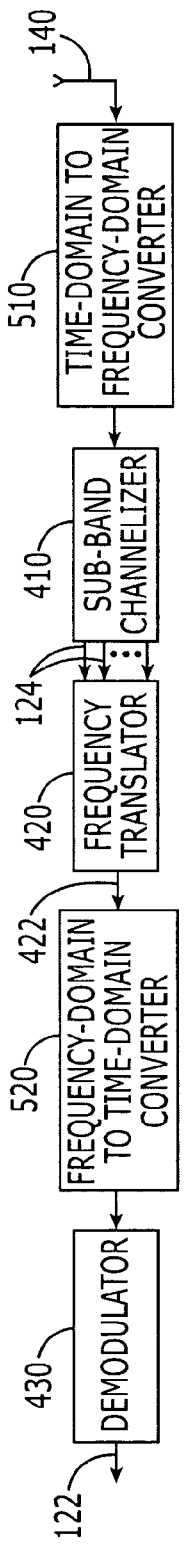

FIG. 5 illustrates receivers according to other embodiments of the present invention that may correspond to receivers 120 of FIG. 1. As shown in FIG. 5, sub-band channelizing takes places in the frequency domain. More specifically, as shown in FIG. 5, a time-domain to frequency-domain converter 510 is configured to convert the signal content of the plurality of second non-contiguous narrowband frequency bands/segments into a frequency domain, wherein the sub-band channelizer 410 is responsive to the time-domain to frequency-domain converter 510. A frequency-domain to time-domain converter 520 is configured to convert the contiguous frequency band/segment 422 back into the time domain, and the demodulator 430 is responsive to the frequency-domain to time-domain converter 520.

In some embodiments of FIG. 5, time-domain to frequency-domain conversion and/or frequency-domain to time-domain conversion may be performed by analog and/or digital components/circuits and/or by signal processing of an analog (continuous-time) and/or digital (discrete-time) nature. In particular, in some digital (discrete-time) embodiments, the time-domain to frequency-domain converter 510 includes an analog-to-digital converter and a Fourier transformer such as a Fast Fourier Transformer, or a functional equivalent thereof, and the frequency-domain to time-domain converter includes an inverse Fourier transformer such as an Inverse Fast Fourier Transformer, or functional equivalent thereof, and a digital-to-analog converter. In these embodiments, the frequency translator 420 is a digital (discrete-time) frequency translator. In other analog embodiments, the time-domain to frequency-domain converter 510 can include a plurality of band-pass filters, and the frequency-domain to time-domain converter 520 can include a summer. In these embodiments, the frequency translator can include a plurality of analog (continuous-time) modulators/mixers.

Figure 6:
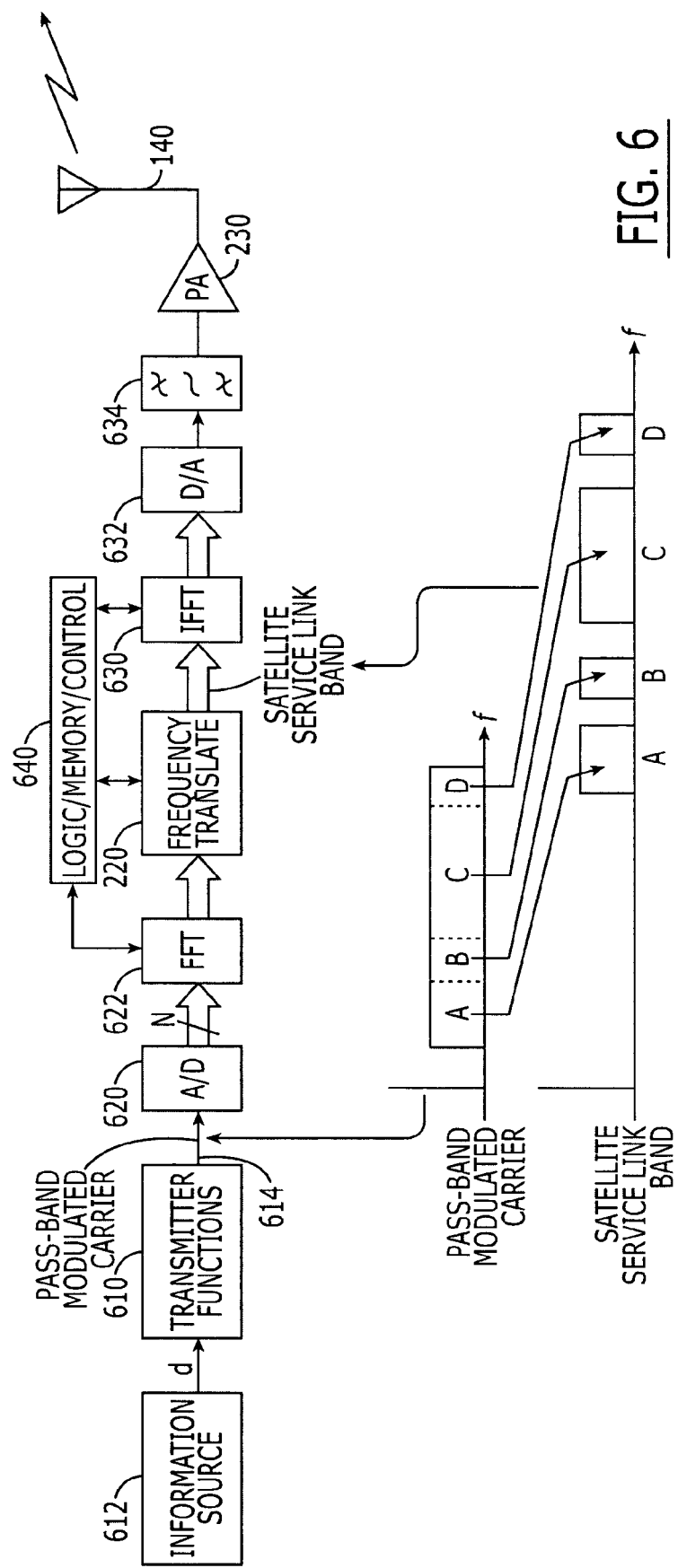
FIG. 6 is a block diagram of transmitters and transmitting methods according to other embodiments of the present invention.

FIG. 6 is a block diagram of transmitters according to other embodiments of the invention, which may correspond to transmitters 110 of FIG. 1. As shown in FIG. 6, an information source 612, which may correspond to the first broadband information 112 of FIG. 1, is provided to transmitter functions 610. The transmitter functions 610 can include a modulator 210, as well as other conventional transmitter functions that can provide, for example, a frame structure and overhead bits, forward error correction, spreading of information, interleaving and/or other conventional transmitter functions. The transmitter functions 610 provide a pass-band modulated carrier 614 that is illustrated schematically in FIG. 6 as including four contiguous subportions A-D. It will be understood that the pass-band modulated carrier 614 can be at an intermediate frequency or at any other frequency that may be, but need not be, in the cellular, PCS or satellite bands.

Still referring to FIG. 6, an analog-to-digital (A/D) converter 620 produces a series of N-bit words from the pass-band modulated carrier 614, which are converted into the frequency domain by a Fast Fourier Transformer (FFT) 622. Thus, the analog-to-digital converter 620 and the Fast Fourier Transformer 622 may correspond to a digital (discrete-time) time-domain to frequency-domain converter 310 of FIG. 3. The input and/or output of the Fast Fourier Transformer 622 may be in the cellular, PCS, satellite and/or other frequency band. A frequency translator 220 then translates/maps the digital (discrete-time) frequency-domain representation of the pass-band modulated carrier 616 into the plurality of non-contiguous narrowband frequency bands/segments, denoted in FIG. 6 as the "Satellite Service Link Band" and shown in FIG. 6 as the four discontinuous bands (frequency segments) A-D. An Inverse FFT (IFFT) 630 and a digital-to-analog (D/A) converter 632 can operate as a digital frequency-domain to time-domain converter 320. A filter 634 may be used to filter signals outside the desired service link band and/or other signal components that may exist at the output of the D/A. Finally, a controller 640 that may include logic, memory and/or other control circuits/functions, including stored program instructions, can be used to control operations of one or more of the blocks of FIG. 6. Those skilled in the art will recognize that one or more mixers (frequency-translation stages) may be configured, if needed, following filter 634 to further condition the signal(s) in frequency placement prior to transmission.

Figure 7:
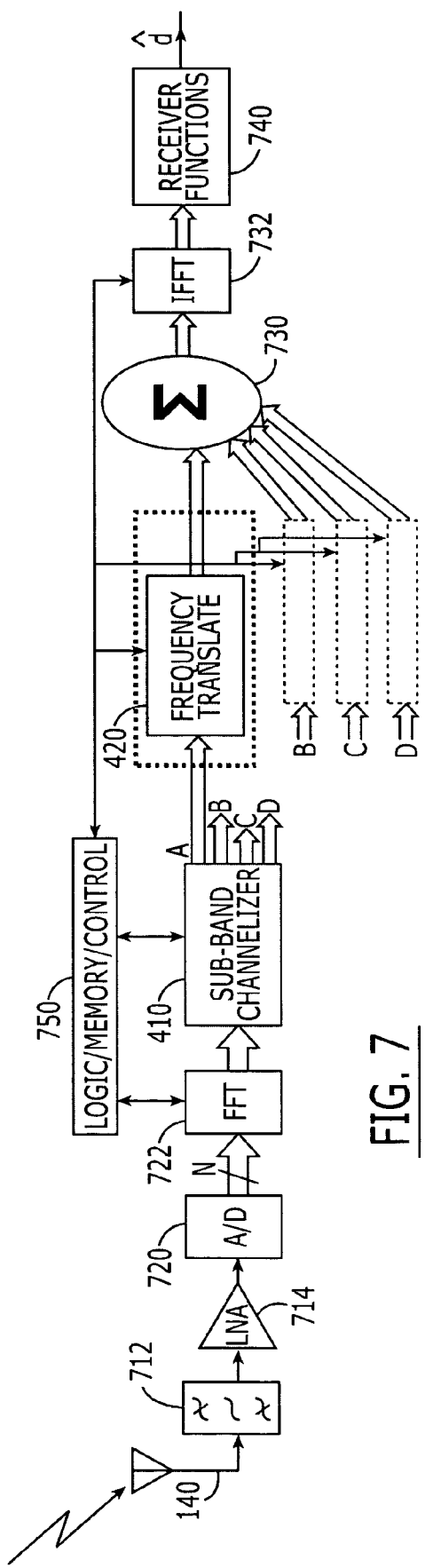
FIG. 7 is a block diagram of receivers and receiving methods according to other embodiments of the present invention.

FIG. 7 is a block diagram of receivers according to other embodiments of the present invention, which may correspond to receivers 120 of FIG. 1. As shown in FIG. 7, the second broadband information that is received from a plurality of second non-contiguous narrowband frequency bands/segments, is filtered by a bandpass filter 712, and then amplified by a Low Noise Amplifier (LNA) 714. The bandpass filter 712 can be a block bandpass filter that passes, for example, an entire band, such as the entire L-band, or may be one or more narrower bandpass filters that only pass selected portions of the band. An analog-to-digital converter 720 and an FFT 722 can provide embodiments of a digital (discrete-time) time-domain to frequency-domain converter 510 of FIG. 5.

It also will be understood that, prior to performing time-domain to frequency-domain conversion, the plurality of second non-contiguous narrowband frequency bands that are received at the antenna 140 may be down-converted (shifted/translated) in frequency using a modulator or mixer. Frequency conversion may take place to any desired carrier frequency or frequencies, which may or may not be in the satellite, cellular or PCS frequency bands. In other embodiments, however, frequency conversion need not be performed. Moreover, in some embodiments, the output of the low noise amplifier 714 is filtered.

Still referring to FIG. 7, the output of the FFT 722 is provided to a sub-band channelizer 410 and to a plurality of frequency translators 420, the outputs of which are summed by a summer 730 and converted back to the time domain by an Inverse FFT (IFFT) 732. The summer 730 and IFFT 732 may form a digital (discrete-time) frequency-domain to time-domain converter 520 of FIG. 5. The output of the IFFT 732 is provided to receiver functions 740, which include a demodulator and other conventional receiver functions.

It also will be understood that combinations and subcombinations of embodiments of FIGS. 1-7 may be provided according to various embodiments of the present invention. Moreover, analogous methods also may be provided. Finally, the detailed design of the individual blocks of FIGS. 1-7 are well known to those having skill in the art and need not be described further herein.

Accordingly, transmitter/receiver embodiments of the present invention may be used by a communications system/method to communicate information via a set of non-contiguous frequency bands/segments, each of which is too narrow to carry the information. A set of frequency blocks/segments that are allocated to a system non-contiguously in frequency (such as the portions of the L-band that are allocated to a given provider non-contiguously in frequency) may be a bottleneck for broadband communications. A transmitter according to embodiments of the invention may be configured to process and segment the spectrum of a broad-band waveform into two or more frequency blocks/segments of appropriate bandwidths, and may be further configured to distribute the segmented broadband waveform frequency blocks/segments over a number of corresponding (two or more) available (narrowband) frequency sub-bands/segments, to thereby transmit the information content of the broadband waveform substantially in whole. A receiver according to embodiments of the invention may be operative to aggregate the (two or more) received spectrum segments of the broadband waveform and to substantially reconstruct a measure of the broadband waveform to derive a measure of the transmitted information.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A wireless communications transceiver comprising:
a transmitter that is configured to selectively frequency shift and transmit portions of first broadband information over a plurality of first non-contiguous narrowband frequency bands/segments, each of which is too narrow to carry the first broadband information, so as to transmit the first broadband information over the plurality of first non-contiguous narrowband frequency bands/segments; and
a receiver that is configured to receive and selectively frequency shift portions of second broadband information from a plurality of second non-contiguous narrowband frequency bands/segments, each of which is too narrow to carry the second broadband information, so as to receive the second broadband information over the plurality of second non-contiguous narrowband frequency bands/segments,
wherein the transmitter comprises:
a modulator that is configured to modulate a first carrier frequency with the first broadband information:
a frequency translator that is configured to translate portions of the first carrier frequency that is modulated with the first broadband information into a plurality of carrier frequencies in the plurality of first non-contiguous frequency bands/segments, each of which is modulated with a portion of the first broadband information; and
a power amplifier that is configured to amplify the plurality of carrier frequencies in the plurality of first non-contiguous frequency bands/segments, each of which is modulated with a portion of the first broadband information.

2. A wireless communications transceiver according to claim 1, wherein the transmitter further comprises:
a time-domain to frequency-domain converter that is configured to convert the first carrier frequency that is modulated with the first broadband information from a time domain into a frequency domain representation, wherein the frequency translator is responsive to the time-domain to frequency-domain converter; and
a frequency-domain to time-domain converter that is configured to convert the plurality of carrier frequencies in the plurality of first non-contiguous frequency bands/segments, each of which is modulated with a portion of the first broadband information, back into the time domain, wherein the power amplifier is responsive to the frequency-domain to time-domain converter.

3. A wireless communications transceiver according to claim 2:
   wherein the time-domain to frequency-domain converter comprises an analog-to-digital converter that is responsive to the modulator and a Fourier transformer that is responsive to the analog-to-digital converter; and
   wherein the frequency-domain to time-domain converter comprises an inverse Fourier transformer that is responsive to the frequency translator and a digital-to-analog converter that is responsive to the inverse Fourier transformer.

4. A wireless communications transceiver according to claim 3 wherein the frequency translator is a digital frequency translator.

5. A wireless communications transceiver according to claim 2:
   wherein the time-domain to frequency-domain converter comprises a plurality of bandpass filters; and
   wherein the frequency-domain to time-domain converter comprises a summer.

6. A wireless communications transceiver according to claim 5 wherein the frequency translator comprises a plurality of modulators.

7. A wireless communications transceiver according to claim 1 wherein the receiver comprises:
   a sub-band channelizer that is configured to isolate the plurality of second non-contiguous narrowband frequency bands/segments;
   a frequency translator that is configured to translate the plurality of second non-contiguous narrowband frequency bands/segments that are isolated, into a contiguous frequency band/segment; and
   a demodulator that is configured to demodulate the contiguous frequency band/segment to extract a measure of the second broadband information.

8. A wireless communications transceiver according to claim 7 wherein the receiver further comprises:
   a time-domain to frequency-domain converter that is configured to convert the plurality of second non-contiguous narrowband frequency bands/segments into a frequency domain representation, wherein the sub-band channelizer is responsive to the time-domain to frequency-domain converter; and
   a frequency-domain to time-domain converter that is configured to convert the contiguous frequency band/segment to a time domain representation, wherein the demodulator is responsive to the frequency-domain to time-domain converter.

9. A wireless communications transceiver according to claim 8:
   wherein the time-domain to frequency-domain converter comprises an analog-to-digital converter that is responsive to the plurality of second non-contiguous narrowband frequency bands/segments and a Fourier transformer that is responsive to the analog-to-digital converter; and
   wherein the frequency-domain to time-domain converter comprises an inverse Fourier transformer that is responsive to the frequency translator and a digital-to-analog converter that is responsive to the inverse Fourier transformer.

10. A wireless communications transceiver according to claim 9 wherein the frequency translator is a digital frequency translator.

11. A wireless communications transceiver according to claim 8:
    wherein the time-domain to frequency-domain converter comprises a plurality of bandpass filters; and
    wherein the frequency-domain to time-domain converter comprises a summer.

12. A wireless communications transceiver according to claim 7 wherein the frequency translator comprises a plurality of modulators.

13. A wireless communications transceiver according to claim 1 wherein the transceiver comprises a portion of a radioterminal, a space-based component, a gateway, a terrestrial base station and/or an ancillary terrestrial component.

14. A wireless communications transceiver according to claim 1 wherein the plurality of first and second non-contiguous narrowband frequency bands/segments are satellite narrowband frequency bands/segments that are controlled by a single satellite communications provider.

15. A wireless communications transceiver according to claim 1 wherein the transmitter is configured to preferentially transmit the first broadband information over the plurality of first non-contiguous narrowband frequency bands/segments, each of which is too narrow to carry the first broadband information, so as to transmit the first broadband information over the plurality of first non-contiguous narrowband frequency bands/segments, while suppressing transmitting the first broadband information outside the plurality of first non-contiguous narrowband frequency bands/segments.

16. A wireless communications transceiver according to claim 1 wherein the transmitter is configured to preferentially assign subportions of the first broadband information to the plurality of first non-contiguous narrowband frequency bands/segments, each of which is too narrow to carry the first broadband information, and to transmit the preferentially assigned subportions of the first broadband information over the plurality of first non-contiguous narrowband frequency bands/segments, so as to transmit the first broadband information over the plurality of first non-contiguous narrowband frequency bands/segments.

17. A wireless communications transceiver according to claim 14 wherein the first and second non-contiguous narrowband satellite frequency bands/segments are in L-band.

18. A wireless transceiver according to claim 1:
    wherein the transmitter is configured to selectively frequency shift and transmit portions of first broadband information without deleting an element of the first broadband information; and
    wherein the receiver is configured to receive and selectively shift portions of second broadband information.

19. A wireless communications transceiving method comprising:
    frequency shifting and transmitting portions of first broadband information over a plurality of first non-contiguous narrowband frequency bands/segments, each of which is too narrow to carry the first broadband information, so as to transmit the first broadband information over the plurality of first non-contiguous narrowband frequency bands/segments; and
    receiving and frequency shifting portions of second broadband information from a plurality of second non-contiguous narrowband frequency bands/segments, each of which is too narrow to carry the second broadband information, so as to receive the second broadband information over the plurality of second non-contiguous narrowband frequency bands/segments, wherein the frequency shifting and transmitting comprises:
modulating a first carrier frequency with the first broadband information;
translating portions of the first carrier frequency that is modulated with the first broadband information into a plurality of carrier frequencies in the plurality of first non-contiguous frequency bands/segments, each of which is modulated with a portion of the first broadband information; and
amplifying the plurality of carrier frequencies in the plurality of first non-contiguous frequency bands/segments, each of which is modulated with a portion of the first broadband information.

20. A method according to claim 19 wherein the frequency shifting and transmitting further comprises:
time-domain to frequency-domain converting the first carrier frequency that is modulated with the first broadband information from a time domain into a frequency domain representation, wherein the translating is responsive to the time-domain to frequency-domain converting; and
frequency-domain to time-domain converting the plurality of carrier frequencies in the plurality of first non-contiguous frequency bands/segments, each of which is modulated with a portion of the first broadband information, to a time domain representation, wherein the amplifying is responsive to the frequency-domain to time-domain converting.

21. A method according to claim 20:
wherein the time-domain to frequency-domain converting comprises Fourier transforming; and
wherein the frequency-domain to time-domain converting comprises inverse Fourier transforming.

22. A method according to claim 21 wherein the translating is performed digitally.

23. A method according to claim 20:
wherein the time-domain to frequency-domain converting comprises bandpass filtering; and
wherein the frequency-domain to time-domain converting comprises summing.

24. A method according to claim 23 wherein the translating comprises modulating.

25. A method according to claim 19 wherein the receiving and frequency shifting comprises:
isolating the plurality of second non-contiguous narrowband frequency bands/segments;
translating the plurality of second non-contiguous narrowband frequency bands/segments that are isolated, into a contiguous frequency band/segment; and
demodulating the contiguous frequency band/segment to extract a measure of the second broadband information.

26. A method according to claim 25 wherein the receiving and frequency shifting further comprises:
time-domain to frequency-domain converting the plurality of second non-contiguous narrowband frequency bands/segments into a frequency domain representation, wherein the isolating is responsive to the time-domain to frequency-domain converting; and
frequency-domain to time-domain converting the contiguous frequency band/segment to a time domain representation, wherein the demodulating is responsive to the frequency-domain to time-domain converting.

27. A method according to claim 26:
wherein the time-domain to frequency-domain converting comprises Fourier transforming; and
wherein the frequency-domain to time-domain converting comprises inverse Fourier transforming.

28. A method according to claim 27 wherein the frequency translating is performed digitally.

29. A method according to claim 26:
wherein the time-domain to frequency-domain converting comprises bandpass filtering; and
wherein the frequency-domain to time-domain converting comprises summing.

30. A method according to claim 25 wherein the frequency translating comprises modulating.

31. A method according to claim 19 wherein the transceiving method is performed by a radioterminal, a space-based component, a gateway, a terrestrial base station and/or an ancillary terrestrial component.

32. A method according to claim 19 wherein the plurality of first and second non-contiguous narrowband frequency bands/segments are satellite narrowband frequency bands/segments that are controlled by a single satellite communications provider.

33. A method according to claim 19 wherein the frequency shifting and transmitting comprises preferentially frequency shifting and transmitting the first broadband information over the plurality of first non-contiguous narrowband frequency bands/segments, each of which is too narrow to carry the first broadband information, so as to transmit the first broadband information over the plurality of first non-contiguous narrowband frequency bands/segments, while suppressing transmitting the first broadband information outside the plurality of first non-contiguous narrowband frequency bands/segments.

34. A method according to claim 19 wherein the frequency shifting and transmitting comprises preferentially assigning subportions of the first broadband information to the plurality of first non-contiguous narrowband frequency bands/segments, each of which is too narrow to carry the first broadband information, and transmitting the preferentially assigned subportions of the first broadband information over the plurality of first non-contiguous narrowband frequency bands/segments, so as to transmit the first broadband information over the plurality of first non-contiguous narrowband frequency bands/segments.

35. A method according to claim 32 wherein the first and second non-contiguous narrowband satellite frequency bands/segments are in L-band.

36. A method according to claim 19:
wherein frequency shifting and transmitting is performed without deleting an element of the first broadband information.

* * * * *